F. M. BENNETT.
SPEED INDICATOR.
APPLICATION FILED NOV. 18, 1918.
1,323,240.
Patented Dec. 2, 1919.
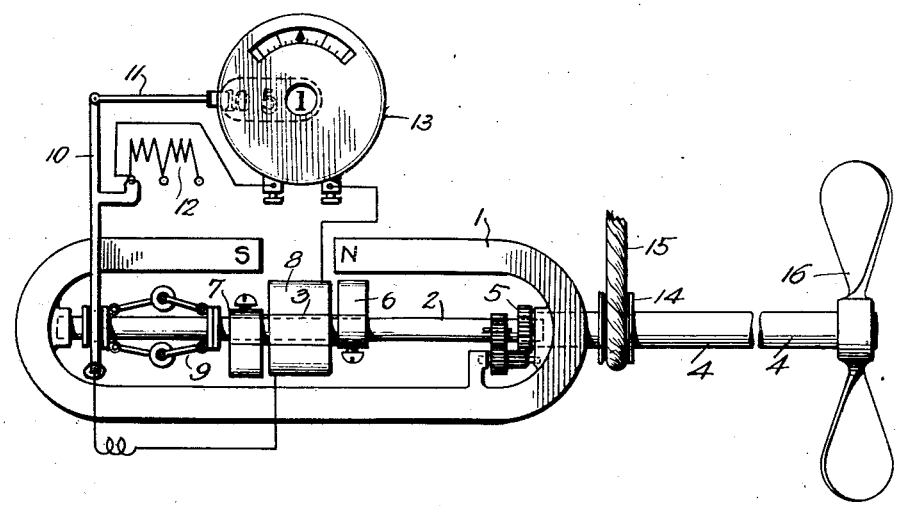

UNITED STATES PATENT OFFICE.

FREDERICK M. BENNETT, OF PHILADELPHIA, PENNSYLVANIA, ASSIGNOR OF ONE-HALF TO GEORGE I. JAMES, OF PHILADELPHIA, PENNSYLVANIA.

SPEED-INDICATOR.

1,323,240.  Specification of Letters Patent.  Patented Dec. 2, 1919.

Application filed November 18, 1918. Serial No. 263,055.

*To all whom it may concern:*

Be it known that I, FREDERICK M. BENNETT, a citizen of the United State of America, and a resident of Philadelphia, in the county of Philadelphia and State of Pennsylvania, have invented a certain new and useful Improvement in Speed-Indicators, of which the following is a specification.

This invention relates to improvement in magneto-electric generators and indicating apparatus for denoting the speed of mechanical movements, or of moving bodies or for such purposes as it may be deemed to be suitable for or adapted to.

The object of the invention is to provide an electromagnetic generator having the circuit windings in a fixed and stationary position relative to the rotating magnetic inductor. I have found in practice that this particular form of generator used in connection with and forming a part of my invention not only adds to the efficiency of but obviates many of the difficulties generally found in apparatus of this kind.

When the generator is used for indicating the speed of vessels or for denoting the flow of fluids it may be incased within a suitable containing receptacle, to prevent deterioration thereof or obstacle to the operation of, or injury, to the parts so protected. It is well known that the voltage of a magneto-electric generator is practically proportional to the speed of the rotation of the armature or moving parts thereof. I utilize the current so obtained in the present instance in the manner hereinafter set forth.

Another object of my invention is to provide a simple, durable apparatus that is readily understood and easily operated by inexperienced persons.

With the above and other objects in view, the invention consists in the construction, arrangement and operation of parts hereinbelow described.

In the drawings, I illustrate one embodiment of my invention, which accompanies and forms a part of this specification.

An elevation constructed according to the invention is illustrated. Referring particularly to the drawing, 1 denotes a magnet in which a shaft 2 is preferably mounted, said shaft ordinarily carrying a sleeve for inductors 6 and 7 and an intermediate coil 8, preferably to encircle the core 3 of the shaft, the said inductors being ordinarily fastened to the shaft 2. I provide means for actuating the said shaft, as a pulley 14 encircled by a belt 15, or a screw 16, carried by the sleeve 4, the sleeve and shaft being preferably connected by speed multiplying means as gears 5.

My speed indicating device preferably comprises a pivoted lever 10, adapted to actuate through an arm 11, a multiplying indicator and volt meter 13 which may be calibrated in terms suitable for the purpose for which it is to be used, the index finger of the latter being controlled by the variations of the current in the wires connected to the coil 8, and the contact with the resistance 12, of the spring finger of the lever 10, and the mechanism of the multiplying indicator being actuated by the governor 9.

It is obvious that the electric connections may be varied so that the variable resistance 12 may be substituted by a variable shunt in which case the connections would be that of a milli-voltmeter, calibrated in terms for the use for which it may be intended.

I wish it to be understood that I do not desire to be limited to the particular use or to the exact details of construction shown and described, for obvious modifications of the same will occur to persons skilled in the art.

What I claim is:—

1. In a device of the class described, a magnet, a coil mounted adjacent to the poles thereof, magnetic inductors spaced by the coil, a shaft to rotate the inductors, a multiplying indicator, and a governor to govern the readings of the indicator.

2. In a device of the class described, a magnet, a coil mounted adjacent to the poles thereof, a shaft to rotate the inductors, a multiplying indicator and a governor to govern the readings of the indicator, in combination with means to rotate the shaft and intermediate means to multiply the speed of rotation thereof.

3. In a device of the class described, an oval-shaped magnet, a coil mounted adjacent to the poles thereof, magnetic inductors spaced by the coil, a shaft to rotate the inductors, an indicating device, and wires to connect the latter with the coil.

4. In a device of the class described, an oval shaped magnet, a coil mounted adjacent to the poles thereof, magnetic inductors spaced by the coil, a shaft to rotate the inductors, an indicating device, and wires to connect the latter with the coil, in combination with means to rotate the shaft, and intermediate means to multiply the speed of rotation thereof.

In testimony of the foregoing specification I do hereby sign the same in the city of Washington, District of Columbia, this 16th day of November 1918.

FREDERICK M. BENNETT.

Witnesses:
JANE M. BARRETT,
J. ODELL FOWLER.